Patented July 27, 1943

2,325,375

UNITED STATES PATENT OFFICE 2,325,375

AMINOPLAST MODIFIED WITH A MALONIC ESTER

Gaetano F. D'Alelio, Pittsfield, Mass., assignor to General Electric Company, a corporation of New York No Drawing. Application July 23, 1940, Serial No. 346,962

23 Claims. (Cl. 260—70)

This invention relates to the production of new materials, specifically condensation products, having valuable and characteristic properties that make them especially suitable for use in industry, for example in casting, molding, laminating, coating and adhesive applications, and for other purposes. The invention is concerned more particularly with compositions of matter comprising potentially heat-convertible (heat-curable) aminoplasts internally modified (chemically united) with a malonic ester, more particularly a di-ester of malonic acid,

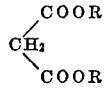

In the above formula R represents any hydrocarbon radical. Thus, R may be, for example, a radical such as alkyl, aryl, alkaryl, aralkyl, hydrocarbocyclic, alkenyl, etc., more specific examples of which are methyl, ethyl, propyl, butyl, isobutyl, amyl, hexyl, octyl, decyl, allyl, methallyl, benzyl, phenethyl, tolyl, etc. In the case of the di-esters the monovalent hydrocarbon radicals represented by R may be the same or different, but preferably are the same. More specific examples of such esters are di-methyl, -ethyl, -propyl, -isopropyl, -butyl, etc., malonates.

As is well known, aminoplasts are synthetic resins prepared from amino or amido compounds, a typical example being urea-formaldehyde resin (reference: Modern Plastics, vol. 17, No. 2, October, 1939, page 433). Ordinarily aminoplasts must be plasticized prior to use, for example in the production of molding compositions, in order to obtain products of optimum commercial utility. Various esters and other organic substances heretofore have been used for this purpose. The prior plasticizers often have been volatile bodies that would volatilize during the process of molding the composition under heat and pressure. Or, if partially retained during molding, the plasticizer sometimes would volatilize during service use, thereby causing strains, cracks or surface crazing in the completed article. The plasticizers usually have been non-reactive materials that could be extracted from the molded article, that is, substances incapable of chemically tying in with the aminoplast (or the components thereof) to become an integral part of the resin molecule.

I have discovered that internally plasticized, potentially thermosetting aminoplasts can be prepared by effecting reaction between the components of a mass comprising an amidogen (amino or amido) compound, e. g., aminotriazines, for instance triaminotriazines such as melamine, etc., urea, thiourea, etc. (or mixtures thereof), an aliphatic aldehyde, e. g., formaldehyde, and a malonic ester, specifically a di-ester of malonic acid. The malonic ester becomes chemically united in the resin molecule with the other starting reactants and is non-volatile and non-extractable therefrom. Compositions comprising a plurality of compounds (reactants) including an amino or an amido compound, an aliphatic aldehyde and a malonic ester, when not initially heat-convertible (that is, capable of curing under heat to an insoluble, infusible state) can be rendered heat-convertible by incorporating therewith a latent or an active (direct) curing catalyst, or by intercondensing therewith curing reactants such, for example, as chloroacetamide, aminoacetamide hydrochloride, chloroacetyl urea, nitrourea, etc. Numerous examples of acidic bodies that function as latent or active curing catalysts and other examples of curing reactants are given hereafter and in various copending applications of mine. Aminoplasts in which a curing reactant is intercondensed with the other components may be termed "self-curing aminoplasts." In such aminoplasts the whole resin molecule including the curing reactant that is an integral part thereof cures (hardens) to an insoluble, infusible state.

Ordinarily when a malonic ester, specifically dimethyl or diethyl malonate, is caused to react with formaldehyde by the known technique, a distinct oily phase separates from the reaction mass. When the reaction is carried out under the catalytic conditions commonly used in the preparation of the usual aminoplasts, an almost instantaneous reaction takes place. It was wholly unexpected and unpredictable, therefore, to find that a malonic ester could be intercondensed with an aliphatic aldehyde, specifically formaldehyde, and an amino or an amido compound to obtain a uniform, homogeneous, potentially thermosetting resinous reaction product possessing a plasticizing body as a permanent and integral part of the resin molecule.

Another advantage accruing from my invention is that by the use of selected esters, more particularly di-esters of malonic acid containing at least four carbon atoms in each ester radical, e. g., di-butyl, -amyl, -hexyl, -octyl, -dodecyl, etc., malonates, the single ester imparts plasticizing, water-repelling and mold-lubricating properties to the resinous body and to molding, laminating, adhesive or other compositions prepared therefrom.

In producing my new condensation products, which may be described more specifically as co-condensation or intercondensation products, the choice of the aliphatic aldehyde component is dependent largely upon economic considerations and upon the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general, the longer the chain of the aliphatic aldehyde, the slower the cure of the resinous condensation product and the softer the final product.

The amido or amino component may be, for instance, urea, thiourea, diurea, diethylene triurea, methyl urea, acetyl urea, benzoyl urea, phenyl thiourea, asymmetrical diethyl urea, allyl urea, 2-chloroallyl urea, ethylidene urea, methylol urea, methylene urea, guanidine, dicyandiamide, guanylurea, guanylthiourea, biguanidine, aminoguanidine, guanoline, etc. Suitable mixtures of such compounds also may be used. The terms "a urea" and "urea substance" as used generally herein and in the appended claims are intended to include within their meaning substances of the kind above mentioned. Other examples of compounds that may be employed as a reactant in the production of the aminoplast are aminotriazines (e. g., ammeline, melamine) and creatinine.

In producing these new compositions comprising a condensation product of a plurality of compounds including a urea or other amido or amino compound, an aliphatic aldehyde and a malonic ester, the initial condensation may be carried out at normal or at elevated temperatures and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, also tri-amines, for instance tri-alkanol amines, e. g., tri-isopropanol amine, tri-alkyl amines, e. g., tri-methyl, tri-ethyl, tri-propyl, tri-isopropyl, tri-butyl, etc., amines, tri-aryl amines, e. g., tri-phenyl amine, tri-benzyl amine, etc. Advantageously I introduce into the reaction mass a nitrogen-containing compound selected from the class consisting of ammonia (which includes within its meaning an aqueous solution of ammonia, specifically ammonium hydroxide), monoamines and diamines. Such nitrogen-containing compounds may be described as alkaline methylol-forming reagents and condensing agents. They are capable of intercondensing with other components of the reaction mass, e. g., formaldehyde, or with products formed during the resin-forming reaction, e. g., methylol urea. On the other hand, when tri-amines such as tri-alkyl and tri-aryl amines are employed they are, to the best of my knowledge and belief, incapable of intercondensing with the other components. Examples of monoamines and diamines are the mono- and di-alkyl amines, e. g., the mono- and di-methyl, -ethyl, -propyl, -isopropyl, -butyl, -amyl, etc., amines, the mono- and di-aryl amines, e. g., mono- and di-phenyl amines, mono- and di-benzyl amines, etc., the mono- and di-alkanol amines, e. g., mono- and di-ethanol amines, etc.

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may add the malonic ester to a partial condensation product of a urea or other amido or amino compound and an aliphatic aldehyde and effect further condensation between the components. Or, I may first condense the malonic ester with an aliphatic aldehyde, add the resulting product to a partial condensation product of an aliphatic aldehyde and a urea or other amido or amino compound and then cause the reaction to proceed further. Or, I may condense or partially condense the malonic ester with an excess of aliphatic aldehyde, add a urea or other amido or amino compound to this condensation product and effect further condensation between the components. Still other ways may be employed in combining the components and in producing the unmodified and modified condensation products of this invention, as will be readily understood by those skilled in the art as the description of my invention proceeds. These condensation reactions may proceed under a variety of time, temperature and pressure conditions. The temperature of the reaction may vary from room temperature to the reflux temperature of the reactants at reduced, atmospheric or superatmospheric pressure.

The products obtained as described above properly may be designated as intermediate condensation products. They may be modified by incorporating therewith a curing catalyst or by intercondensing with a curing reactant thereby to obtain rapidly curing synthetic resins. In some cases, depending upon the particular properties desired in the finished product, such curing catalysts or curing reactants may be omitted.

These intermediate condensation products may be concentrated or diluted further by the removal or addition of volatile solvents to form liquid coating compositions of adjusted viscosity and concentration. The liquid compositions, with or without effect agents (e. g., dyes, pigments, accelerators, oils, etc.), as desired or as conditions may require, may be used, for instance, as surface-coating materials, in the production of paints, varnishes, lacquers, enamels, etc., for general adhesive applications, as anti-creasing agents, in the production of laminated articles, and for numerous other purposes. The heat-curable masses comprising these new condensation products may be used as casting resins. Clear, unfilled, granulated heat-convertible resins also may be produced from those intermediate products of a gel-like nature.

The following examples are given in order to illustrate more clearly how the present invention may be carried into effect. All parts are by weight.

*Example 1*

| | Parts |
|---|---|
| Urea | 57.0 |
| Aqueous ammonia (approximately 28% NH$_3$) | 7.6 |
| Aqueous formaldehyde (approximately 37.1% HCHO) | 161.0 |
| Sodium hydroxide in 10 parts water | 0.04 |
| Diethyl malonate | 8.0 |

The above components were mixed and heated under reflux for 30 minutes, followed by the addition of 0.02 part hydrochloric acid (an active curing catalyst) in 5 parts water. The resulting hydrochloric acid-modified resinous intercondensation product was compounded with 70 parts alpha flock and 0.04 part zinc stearate (mold lubricant). The wet compound was dried at 50° C. for 6 hours, ground, screened and molded at 130° C. for 3 minutes under a pressure of 2000 pounds per square inch. This compound showed excellent plasticity during molding, being considerably better in this respect than compounds similarly made from resins in which the malonic ester was omitted from the formulation. The molded piece was well cured and had a good gloss and color when pulled hot from the mold. When 0.02 part citric acid or 0.02 part phthalic anhydride (both of which also are active curing catalysts) was substituted for the hydrochloric acid, similar results were obtained. The molded articles when pulled hot from the mold were well cured and had a good finish with a high gloss.

Example 2

|  | Parts |
|---|---|
| Urea | 57.0 |
| Aqueous ammonia (approximately 28% NH₃) | 7.6 |
| Aqueous formaldehyde (approximately 37.1% HCHO) | 161.0 |
| Sodium hydroxide in 10 parts water | 0.04 |
| Diethyl malonate | 8.0 |

The above ingredients were mixed and refluxed for 30 minutes.

Resin syrups produced in accordance with the above formulation then were intercondensed separately with each of the following reagents (curing reactants) to produce self-curing aminoplasts:

| Curing reactant | Parts | Additional reflux time |
|---|---|---|
| Chloroacetonitrile | 2.0 | 10 minutes. |
| Gamma-chlorobutyronitrile | 5.0 | 25 minutes. |
| Chloroacetamide (monochloroacetamide) | 1.0 | 10 minutes. |
| Dichloroacetamide | 2.0 | 17 minutes. |
| Trichloroacetamide | 1.0 | 16 minutes. |
| Aminoacetamide hydrochloride | 1.0 | Brought to reflux. |
| Ethylene diamine monohydrochloride | 0.5 | 5 minutes. |
| Diethanol amine hydrochloride | 1.0 | Do. |
| Nitrourea | 0.3 | Brought to reflux. |
| Chloroacetyl urea | 1.0 | 10 minutes. |
| Chloroacetyl hydantoate | 1.0 | 8 minutes. |
| Glycine | 3.0 | Brought to reflux. |
| Aminoacetonitrile hydrochloride | 0.2 | Do. |
| Chloral hydrate | 4.0 | 15 minutes. |
| Chloroacetone | 1.0 | 10 minutes. |
| Alpha, alpha prime-dichloroacetone | 0.3 | Do. |
| Para-chlorophenyl phenacyl bromide | 1.0 | Do. |
| Phenacyl chloride | 1.0 | Do. |

The resulting resin syrups were mixed with alpha flock and a small amount of zinc stearate to form wet molding compounds, which thereafter were dried and ground. The dried compounds were molded at 130° C. for from 3 to 6 minutes under a pressure of 2000 pounds per square inch. The molded articles were well cured, had a very good gloss and were very light in color.

Example 3

Five-tenths (0.5) part of a latent curing catalyst, specifically ethyl glycine ester hydrochloride, was added to a batch of resin syrup prepared as described under Example 1. Heating of the syrup under reflux was continued for 2 minutes after adding the said catalyst. The resulting liquid mass was mixed with 70 parts alpha flock and 0.4 part zinc stearate to form a molding compound. After drying, grinding and molding in the usual manner, molded pieces that showed good plastic flow during molding were obtained. The molded articles were well cured and very light in color. Sodium chloroacetate and diethyl chloroacetamide are illustrative examples of other latent curing catalysts that may be used in place of ethyl glycine ester hydrochloride.

Example 4

|  | Parts |
|---|---|
| Urea | 54.0 |
| Aqueous ammonia (approximately 28% NH₃) | 7.6 |
| Aqueous formaldehyde (approximately 37.1% HCHO) | 161.0 |
| Sodium hydroxide in 10 parts water | 0.04 |
| Di-isopropyl malonate | 6.0 |

The above ingredients were mixed and heated under reflux for 30 minutes. One part of chloroacetamide was added to the reaction mass and heating under reflux was continued for an additional 10 minutes. The liquid resinous intercondensation product obtained by chemical interaction of the components was mixed with 75 parts alpha flock and 0.4 part zinc stearate. The wet mixture was dried and ground to produce a heat-hardenable molding composition. When molded at the usual temperatures and pressures, molded articles were obtained that were well cured, well plasticized and had a very good finish. Other curing reactants, for example reactants such as mentioned under Example 2, may be used in place of the chloroacetamide in the above formula to produce self-curing aminoplasts.

Example 5

|  | Parts |
|---|---|
| Melamine | 113.2 |
| Aqueous ammonia (approximately 28% NH₃) | 6.0 |
| Aqueous formaldehyde (approximately 37.1% HCHO) | 280.0 |
| Sodium hydroxide in 10 parts water | 0.12 |
| Diethyl malonate | 21.6 |

Two batches of resin syrup were prepared in accordance with the above formula, the mixed components of each batch being heated under reflux for 15 minutes. Two parts phthalic anhydride were added to one batch and 0.6 part citric acid to the other. Each syrup then was mixed with 133 parts alpha flock and 0.8 part zinc stearate to form a molding (moldable) compound. The wet compounds were dried for 1¼ hours at 67° C., ground and molded at 130° C. for 3 minutes under a pressure of 2000 pounds per square inch. Both the phthalic anhydride and the citric acid modified compounds showed good flow characteristics during molding and gave excelled molded articles. The heat-hardened compositions could be pulled hot from the mold without distortion.

Instead of using active catalysts such as phthalic anhydride, citric acid, etc., the above described resin syrup may be rendered heat-convertible by incorporating therewith a latent curing catalyst, e. g., by the addition of sodium chloroacetate, diethyl chloroacetamide, etc. When a molding compound containing 2 parts sodium chloroacetate was subjected to a heat test of 65 hours at 67° C., it retained its plasticity and good molding properties. This characteristic is not found in similarly prepared molding compositions in which the malonic ester is omitted from the resin formulation.

Example 6

Separate batches of resin syrup prepared as described under Example 5 were intercondensed with each of the following curing reactants to produce self-curing aminoplasts:

| Curing reactant | Parts | Additional reflux time |
|---|---|---|
| Trichloroacetamide | 2.0 | 5 minutes. |
| Chloral hydrate | 4.0 | Do. |
| Nitrourea | 0.4 | Brought to reflux. |
| Glycine | 0.4 | Do. |
| Diethanolamine hydrochloride | 2.0 | Do. |
| Chloroacetamide | 2.3 | Do. |
| Chloroacetyl urea | 2.3 | Do. |
| Alpha, alpha prime-dichloroacetone | 2.3 | Do. |
| Phenacyl chloride | 2.3 | Do. |
| Aminoacetamide hydrochloride | 2.3 | Do. |

The resulting heat-convertible, liquid resinous intercondensation products were mixed with alpha flock and zinc stearate in the usual proportions, dried, ground and molded in the conventional manner. In all cases, the compound showed good flow characteristics during the molding operation and produced well-cured pieces having a high finish.

*Example 7*

| | Parts |
|---|---|
| Urea | 45.0 |
| Melamine | 31.5 |
| Aqueous formaldehyde (approximately 37.1% HCHO) | 190.0 |
| Aqueous ammonia (approximately 28% NH₃) | 6.0 |
| Sodium hydroxide in 3 parts water | 0.12 |
| Diethyl malonate | 8.0 |

The above components were mixed and heated under reflux for 20 minutes. The resulting resinous syrup was mixed with 1 part ethyl glycine ester hydrochloride, 94 parts alpha flock and 0.5 part zinc stearate. The wet compound was air dried for 17 hours at room temperature and then for 1¾ hours at 70° C. Excellent molded articles were obtained by molding the dried compound for 2 minutes at 130° C. under a pressure of 2000 pounds per square inch.

*Example 8*

| | Parts |
|---|---|
| Melamine | 31.5 |
| Thiourea | 57.0 |
| Aqueous formaldehyde (approximately 37.1% HCHO) | 190.0 |
| Aqueous ammonia (approximately 28% NH₃) | 6.0 |
| Sodium hydroxide in 3 parts water | 0.12 |
| Diethyl malonate | 7.0 |

The above components were reacted, compounded and molded as described under Example 7. Molding of the dried compound gave molded articles that were hard, well cured and had an excellent finish.

The ratio of the reactants to each other may be considerably varied but, in general, it is desirable to use at least one mol of an aliphatic aldehyde for each mol of mixed (total) urea or other amido or amino-compound and malonic ester. Good results are obtained by using at least 1½ mols (e. g., from 1¾ to 5 or 6 mols or more) of an aliphatic aldehyde, specifically formaldehyde, for each mol of total amido or amino compound and malonic ester. Approximately 2 to 3 mols aliphatic aldehyde per mol total amido or amino compound (e. g. urea) and malonic ester usually give very satisfactory results, particularly from the viewpoint of optimum yield of condensation product per unit cost.

The proportion of the malonic ester may be widely varied as desired or as conditions may require, but in most cases is within the range of 0.01 to 0.35 mol malonic ester per mol amido or amino compound. Not exceeding substantially ¼ mol of malonic ester for each mol of amido or amino compound often is used. No advantage ordinarily accrues from using an amount of malonic ester above the minimum required to secure the desired plasticizing effect. The use of higher amounts of malonic ester is undesirable for most applications because of the greater difficulty in obtaining molded articles of suitable hardness, but may not be objectionable for other applications of the material where a permanently, highly-plasticized article is desired. Also, in some cases (particularly when high molecular weight malonic esters, e. g., di-octadecyl malonate, are used) the malonic ester portion of the resin molecule exceeds on a weight basis the amido- or amino-containing portion of the molecule. Consequently, in such cases the inherent characteristics (e. g., waxy nature) of the high molecular weight malonic ester predominate in the resin molecule. This may be objectionable in some applications of the molded part, for instance where optimum resistance to the ordinary organic solvents is required. From this it will be seen that the particular mol ratio of malonic ester to the other components is dependent somewhat upon the inherent characteristics of the malonic ester and upon the plasticizing, solvent-resistance and other characteristics desired in the heat-hardenable (heat-curable) and heat-hardened (heat-cured) resinous condensation products and molding compositions prepared therefrom.

From the foregoing description it will be seen that the present invention provides compositions comprising potentially heat-curable aminoplasts internally modified with a malonic ester, specifically a di-ester of malonic acid, e. g., di-ethyl malonate. It also provides products, e. g., molded articles, comprising heat-cured aminoplasts internally modified with a malonic ester. The invention also provides heat-convertible resinous condensation products of a plurality of compounds including a urea or other amido or amino compound, an aliphatic aldehyde, specifically formaldehyde, a malonic ester and a curing reactant, e. g., glycine, chloroacetone, diethanolamino hydrochloride, etc., and heat-convertible molding compositions, liquid coating compositions, etc., prepared from such resinous condensation products. It also provides heat-hardenable molding compositions comprising (1) a potentially reactive aminoplast internally modified with a malonic ester and (2) an active or a latent curing catalyst, e. g., hydrochloric acid, citric acid, phthalic anhydride, sodium chloroacetate, diethyl chloroacetamide, etc. Excellent thermosetting molding compositions are produced by suitably incorporating a filler and a small amount of a curing catalyst or a curing reactant into a soluble, fusible resinous condensation product of the components of a mass comprising one mol of urea (or a total of one mol of urea and another amido or amino compound, e. g., an aminotriazine such as melamine), at least 1½ mols, advantageously 1¾ to 2½ mols, of an aliphatic aldehyde, specifically formaldehyde, and not exceeding substantially ¼ mol of a malonic ester, specifically diethyl malonate.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamide, benzamide, toluene sulfonamide, etc.; polyamides such as adipic diamide, phthalamide, and the like; amines such as ethylene diamine, aniline, phenylene diamine, aminophenols, etc.

The modifying bodies also may take the form of high molecular weight bodies with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Dyes, pigments and opacifiers may be incorporated into the compositions to alter the visual appearance and the optical properties of the finished product. If needed, mold lubricants may be added to facilitate molding of the heat-convertible molding compositions. Fillers, e. g., alpha cellulose in flock form, asbestos, sand, mica, wood flour, etc., may be added to obtain a wide variety of molding compositions and molded articles adapted to meet particular conditions. Other effect agents also may be added as desired or as conditions may require.

In the preparation of molding compositions, the non-dehydrated or the partially dehydrated condensation products may be compounded with the modifying agents in accordance with procedures well known to those skilled in the plastics art. The wet compositions may be dried in the usual manner at normal (room) temperature or at elevated temperature in a preheated stream of air or under the influence of reflected heat energy. The dried compound may be densified through the usual processes of working in a Banbury mixer or by rolling, pelleting or other means, followed by grinding and screening to the desired particle size. These molding compositions may be molded at elevated temperatures, preferably between 100° and 150° C., and at suitable pressures. The molding pressures generally range between about 1000 and 4000 pounds per square inch.

In addition to their use in molding compositions, the condensation products of this invention may be used as fire-retardants, water-repellents, sizings, as impregnants for electrical coils, and for other purposes. Thus, they may be used in these and other applications as described in my copending application Serial No. 288,034, filed August 2, 1939, now Patent No. 2,214,851, issued September 17, 1940, and assigned to the same assignee as the present invention.

What I claim as new and desire to secure by Letters Patent of the United States is:

1. A composition comprising a potentially heat-curable aminoplast obtained by reaction of ingredients comprising an amidogen compound and an aliphatic aldehyde, said aminoplast being internally modified with a malonic ester corresponding to the formula

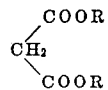

where R represents a monovalent hydrocarbon radical.

2. A product comprising a heat-cured aminoplast obtained by reaction of ingredients comprising an amidogen compound and an aliphatic aldehyde, said aminoplast being internally modified with a malonic ester corresponding to the formula

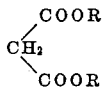

where R represents a monovalent hydrocarbon radical.

3. A composition comprising a condensation product of a plurality of compounds including a urea, an aliphatic aldehyde and a malonic ester corresponding to the formula

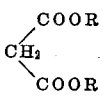

where R represents a monovalent hydrocarbon radical.

4. A composition comprising an alcohol-modified condensation product of a plurality of compounds including a urea, an aliphatic aldehyde and a malonic ester corresponding to the formula

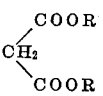

where R represents a monovalent hydrocarbon radical.

5. A composition comprising a potentially heat-convertible aminoplast obtained by reaction of ingredients comprising an amidogen compound and an aliphatic aldehyde, said aminoplast being internally modified with a malonic ester corresponding to the formula

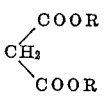

where R represents a monovalent aliphatic hydrocarbon radical.

6. A composition as in claim 5 wherein the malonic ester is di-isopropyl malonate.

7. A composition comprising a potentially heat-convertible aminoplast obtained by reaction of ingredients comprising an amidogen compound and an aliphatic aldehyde, said aminoplast being internally modified with a malonic ester corresponding to the formula

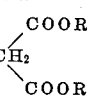

where R represents an alkyl radical.

8. A composition as in claim 7 wherein the diester of malonic acid is di-ethyl malonate.

9. A condensation product of a plurality of compounds including urea, formaldehyde and a malonic ester corresponding to the formula

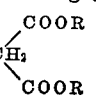

where R represents a monovalent hydrocarbon radical.

10. A condensation product of a plurality of compounds including melamine, formaldehyde and a malonic ester corresponding to the formula

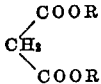

where R represents a monovalent hydrocarbon radical.

11. A condensation product of a plurality of compounds including urea, melamine, formaldehyde and a malonic ester corresponding to the formula

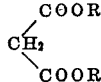

where R represents a monovalent hydrocarbon radical.

12. A composition comprising the product of reaction, in the presence of an alkaline substance, of a plurality of compounds including a urea, an aliphatic aldehyde and a malonic ester corresponding to the formula

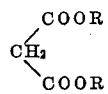

where R represents a monovalent hydrocarbon radical.

13. A composition comprising a condensation product of a plurality of compounds including a urea, an aliphatic aldehyde, a nitrogen-containing compound selected from the class consisting of ammonia, monoamines and diamines, and a malonic ester corresponding to the formula

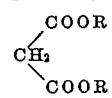

where R represents a monovalent hydrocarbon radical.

14. A potentially heat-convertible resinous condensation product of a plurality of compounds including a urea, formaldehyde and a malonic ester corresponding to the formula

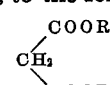

where R represents a monovalent hydrocarbon radical.

15. A product comprising the resinous condensation product of claim 14 in an insoluble, infusible state.

16. A heat-convertible resinous condensation product of a plurality of compounds including (1) a urea, (2) formaldehyde, (3) a malonic ester corresponding to the formula

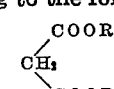

where R represents a monovalent hydrocarbon radical, and (4) a curing reactant.

17. A heat-hardenable molding composition comprising a filler and a heat-convertible resinous condensation product of a plurality of compounds including (1) urea, (2) formaldehyde, (3) a malonic ester corresponding to the formula

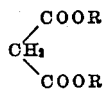

where R represents a monovalent hydrocarbon radical, and (4) a curing reactant.

18. An article of manufacture comprising the heat-hardened molding composition of claim 17.

19. A heat-hardenable molding composition comprising (1) a potentially reactive aminoplast obtained by reaction of ingredients comprising an amidogen compound and an aliphatic aldehyde, said aminoplast being internally modified with a malonic ester corresponding to the formula

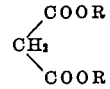

where R represents a monovalent hydrocarbon radical, (2) a filler, and (3) a curing catalyst.

20. The method of preparing new condensation products which comprises effecting reaction between the components of a mass comprising a urea, an aliphatic aldehyde and a malonic ester corresponding to the formula

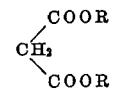

where R represents a monovalent hydrocarbon radical.

21. A composition comprising the product of reaction of ingredients comprising an amidogen compound, an aliphatic aldehyde and a malonic ester corresponding to the formula

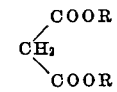

where R represents a monovalent hydrocarbon radical.

22. A composition comprising the product of reaction of ingredients comprising an aminotriazine, an aliphatic aldehyde and a malonic ester corresponding to the formula

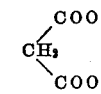

where R represents a monovalent hydrocarbon radical.

23. The method of preparing new condensation products which comprises effecting reaction between ingredients comprising an aminotriazine, an aliphatic aldehyde and a malonic ester corresponding to the formula

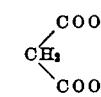

where R represents a monovalent hydrocarbon radical.

GAETANO F. D'ALELIO.